US008478889B2

(12) United States Patent
Bestgen et al.

(10) Patent No.: US 8,478,889 B2
(45) Date of Patent: *Jul. 2, 2013

(54) REAL-TIME MINING AND REDUCTION OF STREAMED DATA

(75) Inventors: Robert Joseph Bestgen, Rochester, MN (US); David Glenn Carlson, Rochester, MN (US); Kevin James Kathmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 185 days.

This patent is subject to a terminal disclaimer.

(21) Appl. No.: 12/372,850

(22) Filed: Feb. 18, 2009

(65) Prior Publication Data

US 2009/0150560 A1 Jun. 11, 2009

Related U.S. Application Data

(63) Continuation of application No. 11/241,708, filed on Sep. 30, 2005, now Pat. No. 7,512,700.

(51) Int. Cl.
*G06F 15/16* (2006.01)
(52) U.S. Cl.
USPC ........... 709/231; 709/232; 707/718; 707/721; 707/769
(58) Field of Classification Search
USPC ................... 709/231, 232; 707/718, 721, 769
See application file for complete search history.

(56) References Cited

U.S. PATENT DOCUMENTS

| 5,412,804 | A | 5/1995 | Krishna |
| 5,765,186 | A | 6/1998 | Searby |
| 5,991,754 | A | 11/1999 | Raitto et al. |
| 6,064,816 | A | 5/2000 | Parthasarathy et al. |
| 6,260,037 | B1 | 7/2001 | Bestgen et al. |
| 6,263,328 | B1 | 7/2001 | Coden et al. |
| 6,289,334 | B1 | 9/2001 | Reiner et al. |
| 6,314,430 | B1 | 11/2001 | Chang |
| 6,317,463 | B1 * | 11/2001 | Prozorov ................. 375/240.29 |
| 6,801,905 | B2 * | 10/2004 | Andrei ................................. 1/1 |
| 6,910,032 | B2 | 6/2005 | Carlson et al. |
| 6,999,958 | B2 | 2/2006 | Carlson et al. |
| 7,430,549 | B2 * | 9/2008 | Zane et al. ............................ 1/1 |
| 7,606,163 | B2 * | 10/2009 | Thorne et al. ................. 370/252 |
| 7,636,710 | B2 * | 12/2009 | Borthakur et al. .................... 1/1 |
| 2002/0035559 | A1 | 3/2002 | Crowe et al. |

(Continued)

OTHER PUBLICATIONS

G. Mitchell, "Extensible Query Processing in an Object-Oriented Database," May 1993, Thesis, Department of Computer Science, Brown University, pp. 1-166.

*Primary Examiner* — Rupal Dharia
*Assistant Examiner* — Van Kim T Nguyen
(74) *Attorney, Agent, or Firm* — Martin & Associates LLC; Derek P. Martin

(57) ABSTRACT

A stream data node receives real-time streamed data from one or more input devices, dynamically filters the streamed data to reduce the streamed data, and delivers the reduced data when requested. By providing real-time filtering of the data, the amount of data that must be stored in a database may be substantially reduced. The stream data node can perform aggregation functions, group functions, and select functions, thereby also significantly reducing the amount of data that must be stored in a database. The stream data node may also be part of a query execution data structure, where it delivers its data when requested by another node in the query execution data structure.

14 Claims, 5 Drawing Sheets

U.S. PATENT DOCUMENTS

| | | |
|---|---|---|
| 2002/0069193 A1 | 6/2002 | Beavin et al. |
| 2003/0161539 A1 | 8/2003 | Montgomery |
| 2003/0187858 A1 | 10/2003 | Kirk et al. |
| 2003/0208489 A1 | 11/2003 | Todd |
| 2003/0229627 A1 | 12/2003 | Carlson et al. |
| 2003/0229639 A1* | 12/2003 | Carlson et al. ................ 707/100 |
| 2005/0060372 A1* | 3/2005 | DeBettencourt et al. ...... 709/206 |
| 2006/0248201 A1* | 11/2006 | Eckert et al. .................. 709/227 |

* cited by examiner

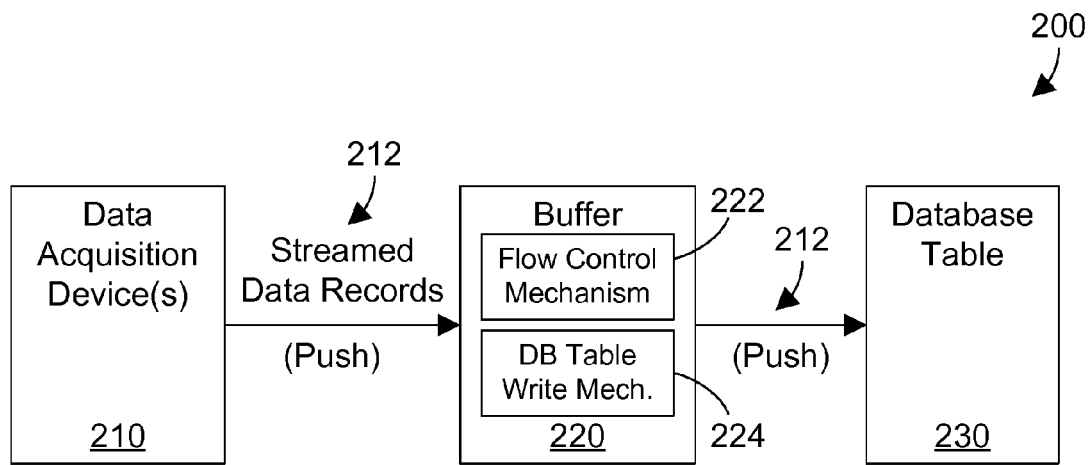
FIG. 2        Prior Art
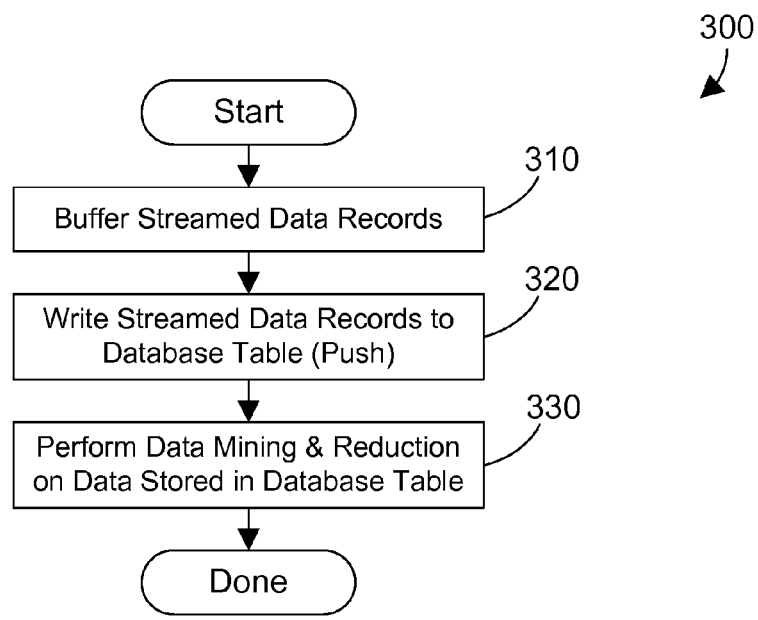
FIG. 3        Prior Art

Select doj.ssnum
from stream, dot, doj
where stream.sensornum not in (1,2,3) and
stream.platenum  dot.platenum and stream.state  dot.state and
dot.ssnum  doj.ssnum stream

| sensornum | platenum | state | . . . |
|---|---|---|---| dot

| platenum | state | ssnum | . . . |
|---|---|---|---|
| 123ABC | MN | 123-45-6789 | . . . |
| 456XYZ | NY | 987-65-4321 | . . . | doj

| ssnum | ... |
|---|---|
| 234-56-7890 | ... |
| 901-23-4567 | ... |

REAL-TIME MINING AND REDUCTION OF STREAMED DATA

CROSS-REFERENCE TO RELATED APPLICATION

This patent application is a continuation of U.S. Ser. No. 11/241,708 filed on Sep. 30, 2005, which is incorporated herein by reference.

BACKGROUND OF THE INVENTION

1. Technical Field

This invention generally relates to the processing of streamed data, and more specifically relates to real-time mining and reduction of streamed data to reduce the amount of data stored in a database.

2. Background Art

There are a variety of different devices that can provide information in electronic form that may need to be analyzed. For example, a system in London, England uses cameras to track license plate numbers of all vehicles in the downtown London area. This type of system allows tracking the vehicles in the downtown area, and specifically allows for determining whether certain vehicles (such as those with identified license plates that belong to suspected terrorists) are in the downtown London area. One can readily appreciate that a large number of vehicles go in and out of the downtown London area each day. The data corresponding to the license plate numbers for all these vehicles streams in from the data collection system. The data may include, for example, the camera location, date, time, license plate number, speed, and other related data. Typically this data is packaged as an Extensible Markup Language (XML) record, and is streamed via various communications mediums to a processing facility. At the processing facility, the data is typically written to a database, where it may be accessed to determine whether the data corresponds to a specified list of license plates. This type of a system requires a significant amount of storage. Because the vast majority of the license plates belong to law-abiding citizens, the vast majority of the data is discarded once it is analyzed and determined that the license plate is not on the specified list of license plates of interest. However, the mere collection of all this data as it streams in from the cameras requires a substantial amount of storage, and requires complex algorithms for mining the data after it is stored and discarding the data that is not of interest.

Radio Frequency Identification (RFID) presents a new paradigm where vast amounts of data are typically stored for later mining and reduction of data. Wal Mart and the U.S. Department of Defense have mandated that their suppliers have RFID tags on all items that cost more than one dollar. As a result, systems are being developed that allow collecting the huge amounts of data for RFID systems. These systems typically dump all the RFID data into a database for subsequent processing (e.g., data mining and reduction). One can easily appreciate that a semi-trailer load of goods being delivered to a Wal Mart store may include tens or hundreds of thousands of items, or potentially millions of items. Once the trailer gets within range of an RFID scanner, each RFID tag will respond with its data, and the collecting system will have to receive, store and analyze all of this information. Even with the availability of high density storage devices, retaining the volumes of new information produced by RFID devices for post-processing and reduction can quickly become cost-prohibitive in terms of both hardware and people resources. Traditional tools that store all of the data in a database, then analyze the stored data, require a significant amount of storage. For example, at a Wal Mart distribution warehouse, dozens or hundreds of trucks may be loaded and dispatched to different destinations every day. Tracking this much information using prior art techniques that store all of the data requires a huge amount of storage. In many cases, all of the individual data is not needed. For example, a system may not really care about the individual identifiers for each bag of candy, but may simply want a total count of the number of bags of the same candy. This type of operation is known as an aggregation in the database world. Storing thousands or millions of RFID identifiers in a database in order to simply count the number of records that have similar RFID identifiers requires a huge amount of storage, which is inefficient. Without a way to mine and reduce streamed data real-time as the data is collected and before it is stored in a database, the computer industry will continue to suffer from inefficient mechanisms and methods for collecting and analyzing streamed data.

DISCLOSURE OF INVENTION

According to the preferred embodiments, a stream data node receives real-time streamed data from one or more input devices, dynamically filters the streamed data to reduce the streamed data, and delivers the reduced data when requested. By providing real-time filtering of the data, the amount of data that must be stored in a database may be substantially reduced. The stream data node can perform aggregation functions, group functions, and select functions, thereby also significantly reducing the amount of data that must be stored in a database. The stream data node may also be part of a query execution data structure, where it delivers its data when requested by another node in the query execution data structure.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is block diagram of a prior art system for acquiring and storing streamed data;

FIG. 3 is flow diagram of a prior art method for collecting and analyzing streamed data;

BEST MODE FOR CARRYING OUT THE INVENTION

The preferred embodiments provide real-time reduction of streamed data before the data is stored in a database to reduce the amount of data that must be stored in the database. A stream data node includes a filter mechanism that reduces the streamed data. Data is read from the stream data node in pull fashion, which means the data is retained in the stream data node until it is requested. By providing real-time reduction of streamed data, the amount of storage required to store the information of interest in the streamed data is substantially reduced.

Figure 1:
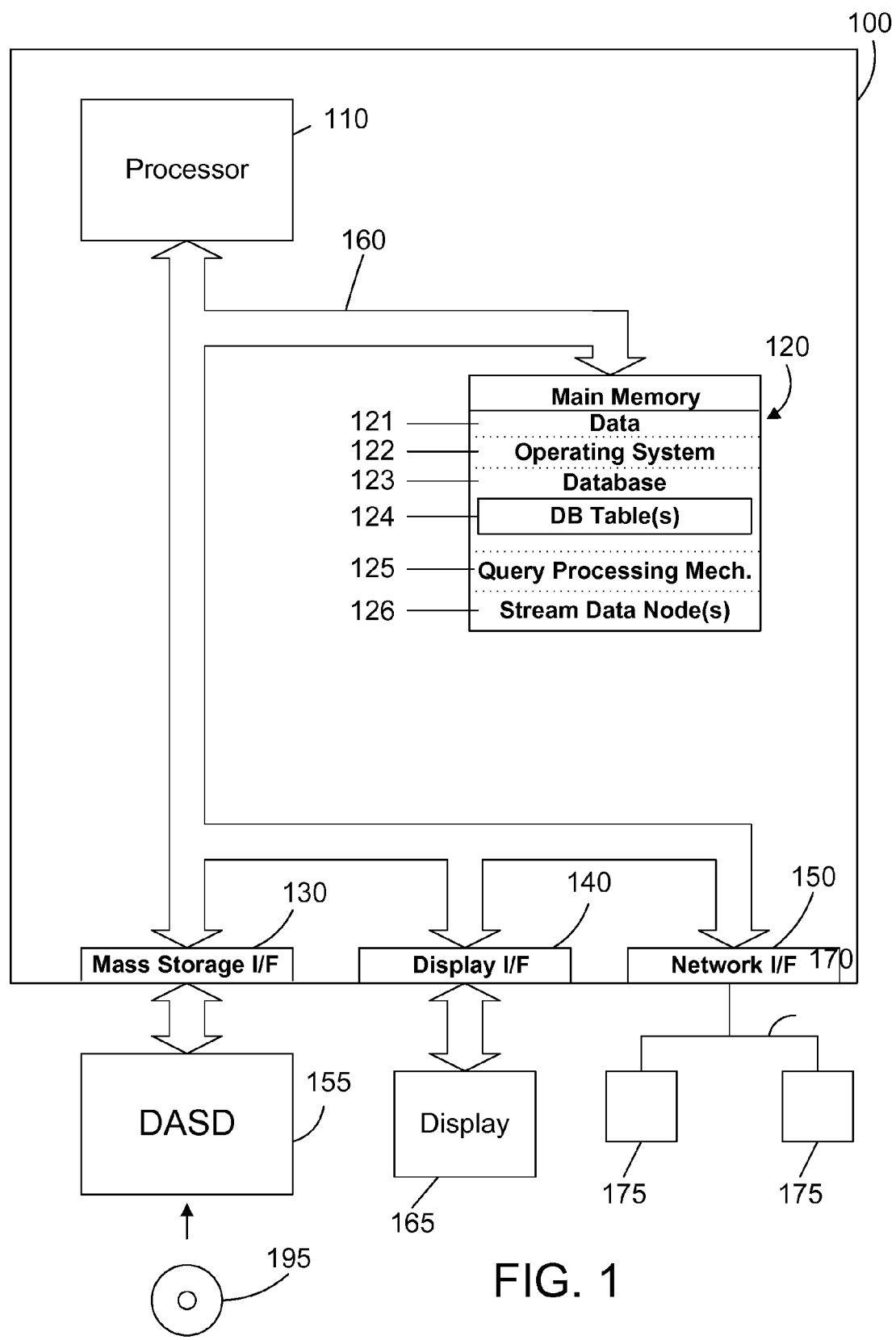
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, a database 123, a query processing mechanism 125, and one or more stream data nodes 126. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Database 123 preferably includes one or more database tables 124. The database 123 and database tables 124 may be in any suitable form or format, whether currently known or developed in the future.

The stream data node 126 provides real-time reduction of streamed data. In one particular embodiment described in detail with respect to FIGS. 6 and 7 below, the stream data node 126 provides data to a query processing mechanism 125 at the request of the query processing mechanism 125. The stream data node 126 is shown and described in more detail below with reference to FIG. 4.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, query processing mechanism 125, and stream data node 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD RW (e.g., 195 of FIG. 1), and transmission type media such as digital and analog communications links. Note that the preferred signal bearing media is tangible.

Referring to FIG. 2, a system 200 shows how streamed data is usually handled in the prior art. System 200 includes one or more data acquisition devices 210 coupled via a network connection to a buffer 220. The buffer 220 receives the streamed data records 212 from the data acquisition devices 210. Buffer 220 includes a flow control mechanism 222 that is used to turn the flow of the streamed data records on or off depending upon how filled the internal memory of the buffer 220 is an any given time. The buffer 220 also includes a database table write mechanism 224 that writes the streamed data in the buffer 220 to a database table 230. In the most common implementation, the streamed data records 212 sent by the data acquisition devices 210 are the same as the streamed data records 212 sent by the buffer 220 to the database table 230. Note that the streamed data records 212 are designated as "Push", which indicates that the data is "pushed" or transferred as quickly as possible without waiting for a request for the data.

Referring now to FIG. 3, a prior art method 300 for the system 200 in FIG. 2 begins by buffering streamed data records (step 310). The streamed data records are then written to the database table in "push" fashion (step 320). Once the streamed data records are in the database table, data mining and reduction may be performed by accessing the data stored in the database table (step 330). The problem with prior art system 200 and method 300 is the requirement to store all streamed data in a database table. Due to the potentially high volume of streamed data, providing storage for all streamed data is expensive, particularly if only a small portion of the streamed data is of interest. The present invention solves this problem by performing real-time mining and reduction of streamed data before the streamed data is stored in a database table.

Figure 4:
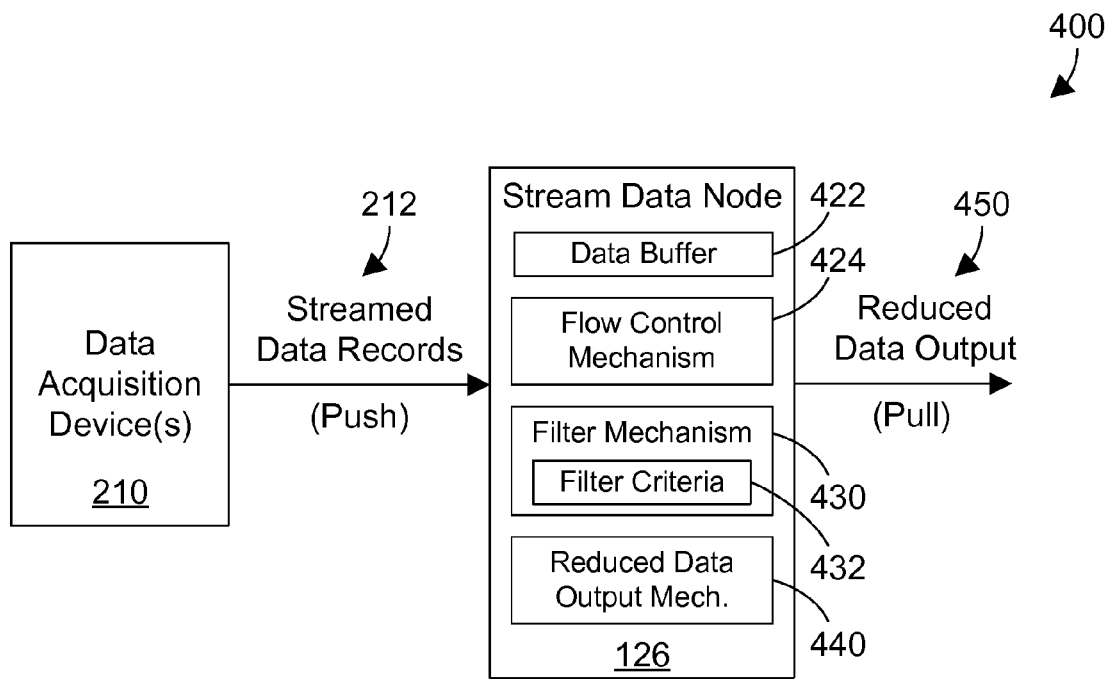
FIG. 4 is a block diagram of a system in accordance with the preferred embodiments for performing real-time reduction of streamed data before the data is stored in a database.

Referring to FIG. 4, a system 400 in accordance with the preferred embodiments includes one or more data acquisition devices 210 coupled to a stream data node 126. The data acquisition devices 210 are shown as one suitable type of data source that is capable of sending streamed data. Note that stream data node 126 is shown in FIG. 1, but is also shown in FIG. 4 with additional details. Stream data node 126 includes a data buffer 422, a flow control mechanism 424, a filter mechanism 430, and a reduced data output mechanism 440. The data buffer 422 and flow control mechanism 424 are similar to the buffer 220 and flow control mechanism 222 shown in FIG. 2, and are used to start and stop the flow of streamed data records 212 from the data acquisition devices 210. The filter mechanism 430 performs real-time mining and reduction of the streamed data records 212. As a result, the reduced data output 450 comprises the reduced data, which is typically a much smaller amount of data than contained in the streamed data records 212. The reduced data output mechanism 440 responds to external requests for data, and provides the reduced data output 450 when an external request is received. One significant difference in system 400 in FIG. 4 compared to prior art system 200 in FIG. 2 is that, in prior art system 200, the data is pushed from the data acquisition devices 210 to the buffer 220, then pushed by the buffer 220 to the database table 230. In the system 400 in FIG. 4 in accordance with the preferred embodiment, the data is pushed from the data acquisition devices 210 to the stream data node 126, but is pulled from the stream data node by some external request, such as a query or request from an application. By changing the functional mode on the data output from push to pull, the stream data node can provide data as needed by queries or applications according to their external requests. Thus we see that while the database table write mechanism 224 in FIG. 2 writes data to the database table 230 according to some specified logic within the database table write mechanism 224 (push), the reduced data output mechanism 440 in FIG. 4 instead waits to receive an external request before providing the reduced data output 450 (pull).

Filter mechanism 430 reduces the streamed data records 212 according to some defined filter criteria 432. The filter criteria 432 may be any suitable criteria for reducing data, whether currently known or developed in the future. One example of a suitable filter criteria is an aggregation function, such as counting the occurrences of certain data in the streamed data records. For example, in the RFID example presented in the Background section, aggregation could allow counting the occurrences of a given product without storing a data record for each and every instance of that product. Thus, if there are four cases of Tide liquid laundry detergent that each contain 16 bottles, an aggregation function would simply count the 64 bottles without storing a record for each of the 64 bottles in a database. Another example of a suitable filter criteria includes a grouping function. Grouping allows specifying groups, and counting occurrences within the defined group. Thus, grouping also eliminates a significant amount of data by reducing the streamed data records to only records that are in a defined group. Yet another example of a suitable filter criteria includes a select function. A select function is similar to a database query that includes a SELECT statement, where conditions in the SELECT statement must be satisfied for the data to be included in the reduced data output. While aggregation, group, and selection functions are explicitly discussed above, the preferred embodiments extend to any and all filter criteria that are capable of reducing the streamed data records 212.

Figure 5:
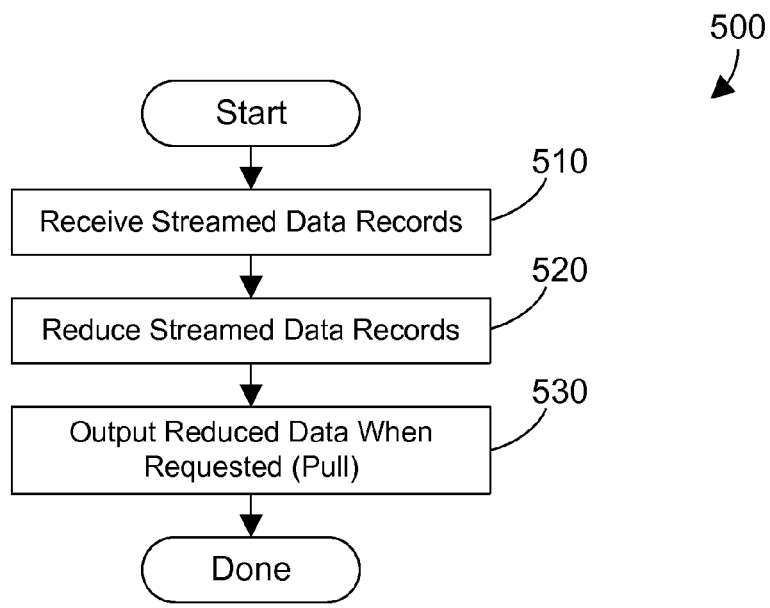
FIG. 5 is a flow diagram of a method in accordance with the preferred embodiments for performing real-time reduction of streamed data.

Referring to FIG. 5, a method 500 in accordance with the preferred embodiments indicates steps that may be run on the system 400 in FIG. 4. First, streamed data records are received from the data acquisition devices 210 (step 510). Note that the receiving of the streamed data records in step 510 may include buffering using the data buffer 422 and flow control mechanism 424 shown in FIG. 4. The streamed data records 212 are then reduced (step 520). In the preferred embodiments, the streamed data records 212 are reduced by the filter mechanism 430 according to the defined filter criteria 432. The reduced data is then output when an external request for the data is received (step 530). Method 500 clearly shows how the streamed data records are dynamically reduced real-time by the stream data node before any of the data in the streamed data records are stored in a database table. The stream data node thus performs real-time mining and reduction of the streamed data records, thereby significantly reducing the storage requirements for the system 400 when compared to the prior art system 200 in FIG. 2.

Figures 6, 7, 8, 9:
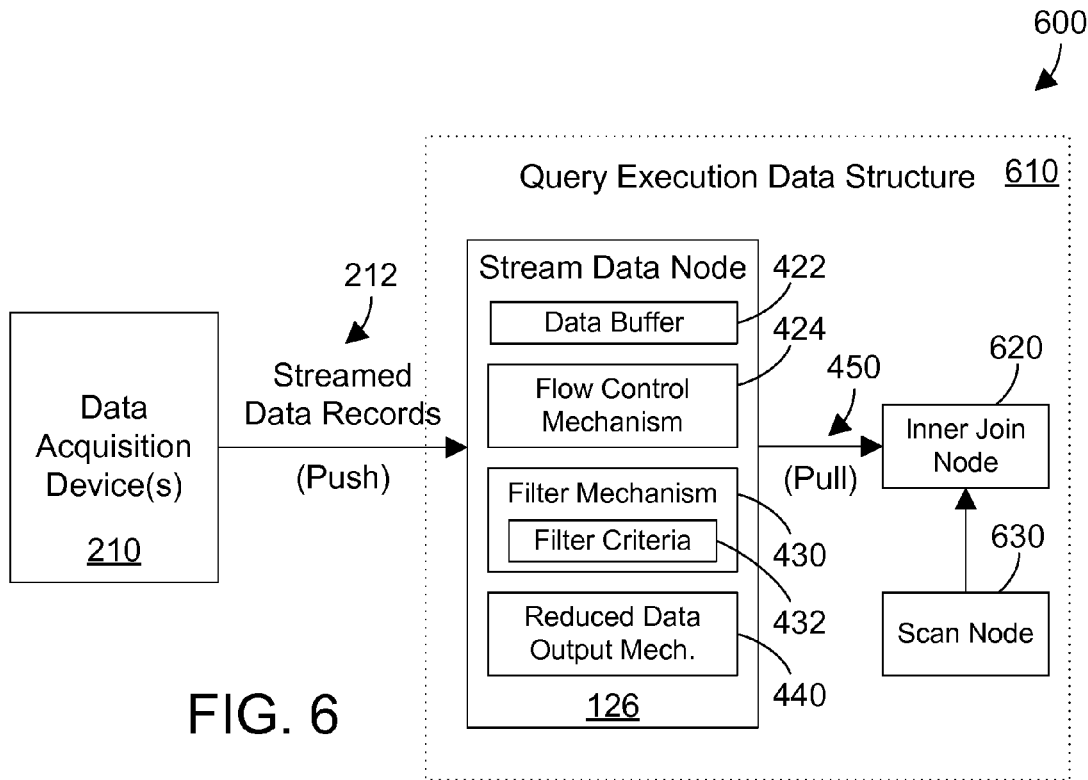
FIG. 6 is a block diagram of a system in accordance with the preferred embodiments showing a stream data node as part of a query execution data structure.
FIG. 7 is a sample query.
FIG. 8 is a sample stream record format for the sample query in FIG. 7.
FIG. 9 is a sample dot table for the sample query in FIG. 7.

One specific application for the stream data node 126 shown in FIG. 4 is in a query execution data structure 610, as shown in FIG. 6. U.S. Pat. No. 6,915,291 discloses an object-oriented query execution data structure. The query execution data structure represents a query execution plan for data stored in database tables. In the preferred embodiments, because the data output of the stream data node 126 is pull instead of push, the stream data node may now be used as a node in a query tree in the query execution node data structure. In this manner, a query may use a streamed data source in the same way data from a database table is used. The stream data node 126 preferably provides its reduced data output 450 in a format that is compatible with other nodes in the query execution data structure 610. For the simple example in FIG. 6, the stream data node 126 is coupled to an inner join node 620, which is also coupled to a scan node 630. Note that the query execution data structure 610 of FIG. 6 is one suitable implementation for the query processing mechanism 125 in FIG. 1.

A simple example is now presented to illustrate how the stream data node of the preferred embodiments may be used in a query execution data structure as defined in U.S. Pat. No. 6,915,291. We first consider a sample query in FIG. 7. We assume that traffic is being monitored by cameras real-time, creating streaming data that includes time of day, license plate numbers, etc. One way to use the streaming data from the traffic cameras is to identify when a license plate number in the streamed data is in a database of license plate numbers that correspond to criminals for whom arrest warrants have been issued. A sample query in shown in FIG. 7. For this example, we assume that the query excludes streamed data from cameras that have sensor numbers 1, 2 and 3, because these cameras are on a stretch of road that is closed for construction work (for example). This example illustrates the filter mechanism 430 with its filter criteria 432, which will filter out (i.e., exclude) streamed data from the cameras that have sensor numbers 1, 2 and 3.

We see from the query in FIG. 7 that there are three different data sources, the streamed data records from the sensors (stream), the department of transportation database table (dot) and the department of justice database table (doj). One sample format for the stream data records is shown in FIG. 8. The stream record includes a sensornum field that contains the sensor number, a platenum field that contains the plate number read by the sensor off the license plate, and a state field that contains a two letter state code that corresponds to the state read off the license plate. Note that other data may also be included in the stream record, as indicated in FIG. 8, such as date, time of day, or any other suitable information.

A sample dot table is shown in FIG. 9, and includes a platenum column that contains the license plate for a vehicle, a state column that contains the state corresponding to the license plate, and a ssnum column that contains the social security number of the owner of the vehicle. Of course, the dot table could contain additional information as well. A sample doj table is shown in FIG. 9, and includes a ssnum column that contains the social security number of wanted criminals, and may also contain other information as well.

Figures 10, 11:
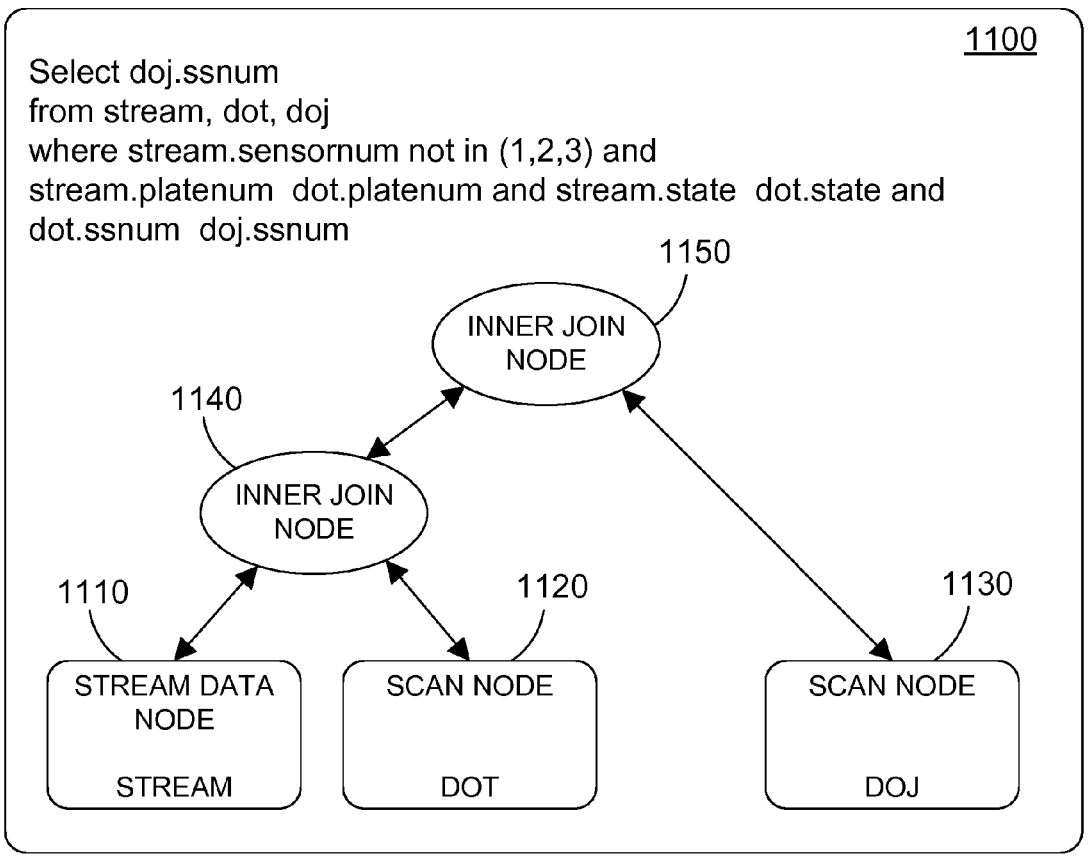
FIG. 10 is a sample doj table for the sample query in FIG. 7.
FIG. 11 is a block diagram of a query execution data structure in accordance with the preferred embodiments showing one specific example of a stream data node for the sample query in FIG. 7.

A query execution data structure 1100 is shown in FIG. 11 to include a stream data node 1110 that receives the streamed data records in the format of FIG. 8 from a data source called "stream". The stream data node 1110 is one specific example of stream data node 126 in FIGS. 1 and 4. The query execution data structure 1100 also includes scan nodes 1120 and 1130 that query the two database tables dot and doj, respectively. There are two inner join nodes 1140 and 1150 which are required to implement the logic in the query. Note that many details of the implementation of the query execution data structure 1100 are omitted herein. This example is shown as an illustration of how a stream data node of the preferred embodiments may be referenced in a standard query in the same manner that database tables are referenced. By specifying the stream data node in the query, the present invention eliminates the need to store all data coming from the traffic cameras for subsequent data mining and reduction. Dynamic data mining and reduction is performed by the stream data node of the present invention, thereby eliminating much of the storage that would otherwise be required to store all of the streamed data for later analysis.

The preferred embodiments provide an apparatus and method for performing real-time reduction of streamed data. By reducing streamed data to data of interest, the storage requirements for the data of interest is significantly less than for all of the streamed data. In addition, the pull-type interface of a stream data node of the preferred embodiments allows the stream data node to provide the reduced data to anything that is capable of generating a request for the data to the stream data node.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. An apparatus comprising:
   at least one processor;
   a memory coupled to the at least one processor; and
   a stream data node residing in the memory that receives streamed data from at least one data source, dynamically reduces the streamed data using a filter mechanism that specifies data to exclude from the streamed data according to at least one filter criterion as the streamed data is received before storing the streamed data in a database, and delivers the reduced streamed data when an external request is received, wherein the stream data node is part of a query execution data structure representing a query execution plan for querying data stored in database tables, wherein the query execution data structure includes at least one join node, and wherein the stream data node delivers the reduced streamed data when requested by a different node in the query execution data structure.

2. The apparatus of claim 1 wherein the at least one filter criterion specifies an aggregation function.

3. The apparatus of claim 1 wherein the at least one filter criterion specifies a group function.

4. The apparatus of claim 1 wherein the at least one filter criterion specifies a select function.

5. A computer-implemented method for processing streamed data from at least one data source, the method comprising the steps of:
   (A) providing at least one processor;
   (B) providing a computer readable memory coupled to the at least one processor;
   (C) a stream data node receiving the streamed data from the at least one data source, wherein the stream data node is part of a query execution data structure representing a query execution plan for querying data stored in database tables, wherein the query execution data structure includes at least one join node;
   (D) the stream data node dynamically reducing the streamed data using a filter mechanism that specifies data to exclude from the streamed data according to at least one filter criterion as the streamed data is received before storing the streamed data in a database in the memory; and
   (E) the stream data node delivering the reduced streamed data from the database in the memory when requested by a different node in the query execution data structure.

6. The method of claim 5 further comprising the step of buffering in the memory the streamed data received in step (C).

7. The method of claim 5 wherein the at least one filter criterion specifies an aggregation function.

8. The method of claim 5 wherein the at least one filter criterion specifies a group function.

9. The method of claim 5 wherein the at least one filter criterion specifies a select function.

10. The method of claim 5 wherein step (E) is performed when the external request is made by a node in a query execution data structure.

11. A computer-readable program product comprising software residing on non-transitory media, the software comprising:

a stream data node that receives streamed data from at least one data source, dynamically reduces the streamed data using a filter mechanism that specifies data to exclude from the streamed data according to at least one filter criterion as the streamed data is received before storing the streamed data in a database, and delivers the reduced streamed data when an external request is received, wherein the stream data node is part of a query execution data structure representing a query execution plan for querying data stored in database tables, wherein the query execution data structure includes at least one join node, and wherein the stream data node delivers the reduced streamed data when requested by a different node in the query execution data structure.

12. The program product of claim 11 wherein the at least one filter criterion specifies an aggregation function.

13. The program product of claim 11 wherein the at least one filter criterion specifies a group function.

14. The program product of claim 11 wherein the at least one filter criterion specifies a select function.

* * * * *